United States Patent
Rozand et al.

(10) Patent No.: US 10,110,011 B2
(45) Date of Patent: Oct. 23, 2018

(54) METHODS AND APPARATUS FOR CONTROLLING POWER CONVERTERS IN PARALLEL CONNECTION

(75) Inventors: Daniel Rozand, Romans sur Isere (FR); Patrick Chambon, Saint Martin d'Heres (FR); Stefano De Cesaris, Grenoble (FR)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 1109 days.

(21) Appl. No.: 14/370,819

(22) PCT Filed: Jan. 5, 2012

(86) PCT No.: PCT/IB2012/000165
§ 371 (c)(1),
(2), (4) Date: Sep. 11, 2014

(87) PCT Pub. No.: WO2013/102782
PCT Pub. Date: Jul. 11, 2013

(65) Prior Publication Data
US 2015/0001947 A1 Jan. 1, 2015

(51) Int. Cl.
*H02J 3/46* (2006.01)
*H02J 9/06* (2006.01)

(52) U.S. Cl.
CPC .............. *H02J 3/46* (2013.01); *H02J 9/062* (2013.01); *Y10T 307/707* (2015.04)

(58) Field of Classification Search
CPC ......... H02J 3/46; H02J 9/062; Y10T 307/707; Y10T 307/082
See application file for complete search history.

(56) References Cited

U.S. PATENT DOCUMENTS 5,157,269 A * 10/1992 Jordan ............... G05F 1/59
307/31
5,436,512 A * 7/1995 Inam ............... H02J 9/062
307/105

(Continued)

FOREIGN PATENT DOCUMENTS

| EP | 1605571 A1 | 12/2005 | |
| GB | 2293503 A | 3/1996 | |
| GB | 2293503 B * | 8/1998 | ............ H02J 3/48 |

OTHER PUBLICATIONS

International Search Report and Written Opinion dated Jan. 28, 2013 for PCT/IB2012/000165.

(Continued)

*Primary Examiner* — Swarna N Chowdhuri
(74) *Attorney, Agent, or Firm* — Lando & Anastasi, LLP

(57) ABSTRACT

An uninterruptible power supply (UPS) system (100) comprises a plurality of UPS units (UPS-1, UPS-2) connected in parallel. Each UPS unit comprises a power converter (124) for supplying a share (i_load_1, i_load_2) of a total load current (i_tot). The total load is shared automatically between UPS units of power ratings, in a proportionate manner. A controller 130 of each converter is arranged to establish real-time feedback control of a current supplied by the power converter. An exchange current (i_exch) for each converter represents an imbalance between an output current of the converter in question and output currents of the parallel converters. Exchange current sensing circuits of the parallel-connected UPS units are connected together. The controller steers the exchange current of each converter toward a value (i_exc_c) that is a non-zero proportion of a current (i_mut) sensed within the converter. Said non-zero proportion is calculated such that the exchange current will be steered towards a positive value in the case of a converter with higher than average nominal power rating and toward a negative value in the case of a converter with lower than average power rating.

17 Claims, 3 Drawing Sheets

(56) References Cited

U.S. PATENT DOCUMENTS

| | | | |
|---|---|---|---|
| 8,552,589 B2 | 10/2013 | Ghosh et al. | |
| 9,373,979 B2 | 6/2016 | Ghosh et al. | |
| 9,667,069 B2 | 5/2017 | Beg | |
| 2005/0275290 A1* | 12/2005 | Inn | H02J 1/102 307/55 |
| 2006/0083039 A1 | 4/2006 | Oliveira et al. | |
| 2007/0248877 A1* | 10/2007 | Qahoug | H02J 1/10 429/121 |
| 2008/0309300 A1 | 12/2008 | Chao et al. | |
| 2011/0278934 A1 | 11/2011 | Ghosh et al. | |
| 2014/0101462 A1* | 4/2014 | Rose | G06F 1/263 713/300 |
| 2014/0103725 A1 | 4/2014 | Ghosh et al. | |
| 2014/0239723 A1 | 8/2014 | Beg | |

OTHER PUBLICATIONS

Spears, Ed. "Parallel UPS configurations." Eaton White Paper. Jan. 2009. pp. 1-10.

Schneider Electric. "Smart-UPS VT in Parallel." Dec. 2009. pp. 1-21.

Wikipedia. "Uninterrupt_power-ble Power Supply." http://en.wikipedia.org/wiki/Uninterruptible_power_supply.

\* cited by examiner

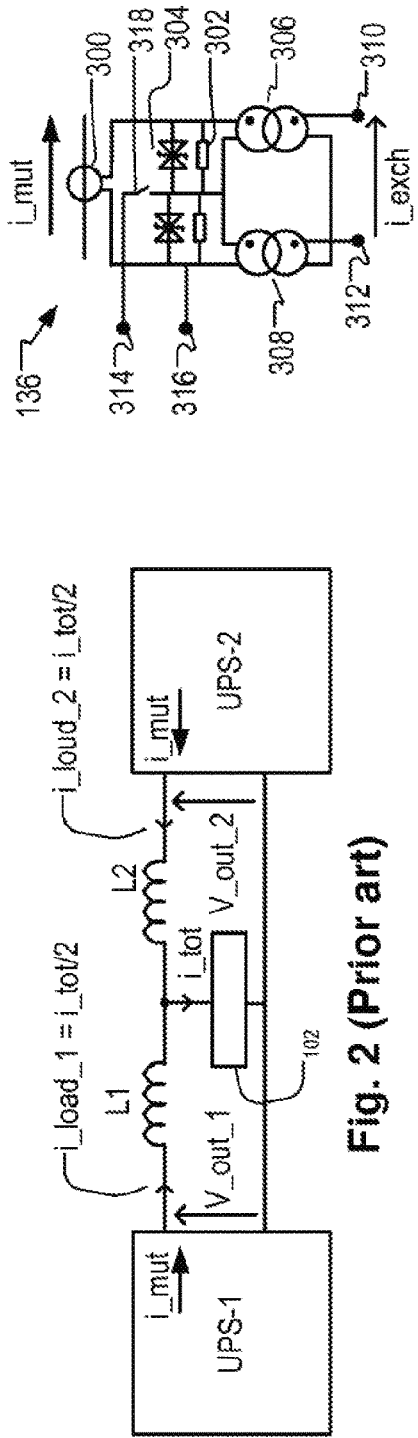
Fig. 2 (Prior art)
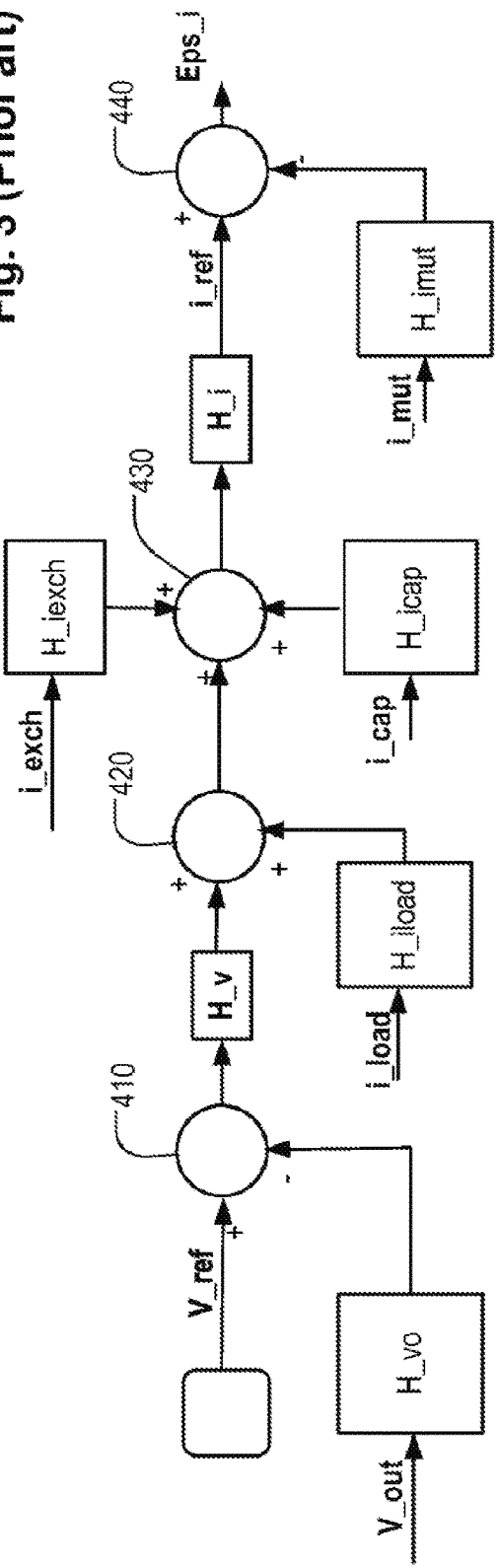
Fig. 3 (Prior art)
Fig. 4 (Prior art)

METHODS AND APPARATUS FOR CONTROLLING POWER CONVERTERS IN PARALLEL CONNECTION

FIELD

The invention relates generally to methods and apparatus for controlling power converters. Such power converters may operate for example in an uninterruptible power supply (UPS) system.

BACKGROUND

Power converters can be used in an uninterruptible power supply (UPS) system, of conditioning and safeguarding electric supplies to sensitive or critical equipment. A common use for UPS systems is in data centers. To increase capacity and security of supply, UPS units can be connected in parallel, so that a current supplied to a load is the sum of currents supplied by a number of UPS units. Known UPS units adapted for such parallel applications comprise special features to ensure that "exchange current", representing an imbalance between an output current of the converter in question and output currents of the parallel converters, is sensed and controlled to be zero. In this way, each UPS automatically adjusts its operation so as to supply an equal share of the total load current. The special features may comprise additional sensing circuits to measure exchange in each unit, and programming of a controller to respond to the sensed exchange current, in addition to other parameters and sensed values.

UPS units are available in a range of sizes, each having for example a nominal power rating such as 100 kVA, 300 kVA, 500 kVA etc. For increased flexibility in the provision of UPS systems, it would be advantageous to be able to connect units with different power ratings in parallel. In such a case, however, the known controller will simply force each unit to take an equal share of the load current. Weaker units will be over-loaded, while stronger units are under-utilized.

SUMMARY

Methods, apparatus and systems are provided for controlling a number of power converters that are connected in parallel to supply a total electric current to a load. According to a first aspect of the invention there is provided a method for controlling a number of power converters that are connected in parallel to supply a total electric current to a load. The method comprises: establishing real-time feedback control within each power converter so as to control a current supplied by that converter in accordance with a desired condition of supply; sensing in real time an exchange current for each converter, the exchange current representing an imbalance between an output current of the converter in question and output currents of the other converters operating in parallel; modifying said feedback control in response to the sensed exchange current so as to steer the exchange current of each converter toward a value that is a non-zero proportion of a current supplied by the converter, the non-zero proportion being different for different ones of said converters, whereby each converter is controlled to supply a predetermined proportion of the total electric current that is different for different ones of said converters.

According to a second aspect of the invention, there is provided a power converter apparatus suitable for use as one of a number of power converters that are connected in parallel to supply a total electric current to a load. The power converter comprises: a plurality of switches and other components connected to be operable as a power converter; a controller arranged to establish real-time feedback control of said switches so as to control a current supplied by the power converter in response to one or more sensor inputs and in accordance with a desired condition of supply; and a module for sensing in real time an exchange current for each converter, the exchange current representing an imbalance between an output current of the converter in question and output currents of the other converters operating in parallel; wherein said controller is arranged to modify said feedback control in response the sensed exchange current so as to steer the exchange current of each converter toward a value that is a non-zero proportion of a current sensed within the converter.

According to a third aspect of the invention, there is provided an UPS system. The UPS system comprises a plurality of UPS units connected in parallel, and each UPS unit comprises an above-mentioned power converter.

According to a fourth aspect of the invention, there is provided a computer program product for a power converter controller. The computer program product comprises instructions for causing a controller to operate with a non-zero exchange current, in accordance with an above-mentioned method.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the art based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention. Embodiments of the invention are described, by way of example only, with reference to the accompanying drawings.

FIG. 2 illustrates equal sharing of a load current between two UPSs connected in parallel, in a known system;

FIG. 3 is a diagram of an exchange current measurement module for use in regulating load sharing in a parallel UPS system;

FIG. 4 is an example of a current control loop in a known UPS system, including exchange current compensation using the module of FIG. 3;

DETAILED DESCRIPTION

Figure 1:
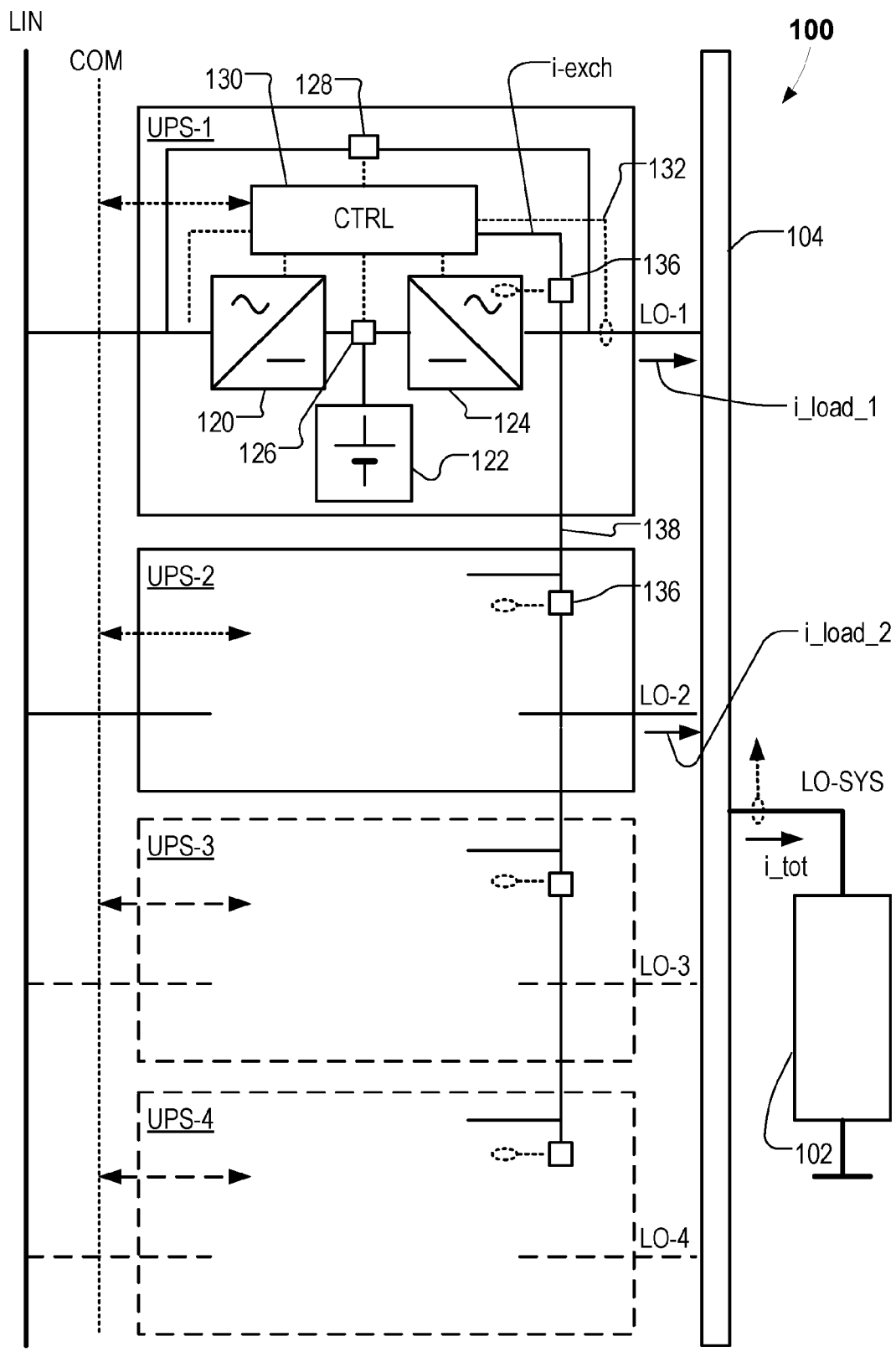
FIG. 1 is a schematic block diagram of an uninterruptable power supply (UPS) system, in which various UPS units are connectable in parallel to supply a shared load.

FIG. 1 illustrates an uninterruptable power supply (UPS) system 100 for delivering a reliable and consistent power supply to a load 102. Load 102 may, for example, comprise an IT system of server computers, communications units and the like, such as would be found in a modern data centre, but the invention is not limited to such applications. The UPS system receives mains electric power through a supply illustrated generally as an input bus LIN (live in). A number of UPS units UPS-1, UPS-2 etc are connected to receive the incoming mains supply, and to generate individual outgoing supplies LO-1, LO-2 etc (live out). The live out connections from the individual UPS units are connected in parallel through a switch network 104 to drive the system live output LO-SYS. The live in and live out connections are shown as single lines in the diagram, but in reality each may comprise two or more lines. In a single-phase installation, the live out connection may comprise live and neutral lines. In a 3-phase system, each outgoing supply LO-1 etc. connection could be 3 live wires, and optionally a neutral connection. These details are very familiar to the skilled person and do not need to be explained herein.

Within the first UPS unit, UPS-1, there are shown some schematic details of the major components of a typical UPS. The other UPS units may have similar form, and their internal detail is not shown, for simplicity. As is generally known, a typical UPS unit comprises an AC-DC converter 120, a DC battery 122 and a DC-AC converter 124. Converter 120 receives power from the live input and converts it for use charging the battery 122. Battery 122 stores energy for use in case of power interruption at the input side, and converter 124 converts and conditions energy from the battery to drive the live output LO-1. The battery 122 and converter 124 may be controlled to be operational only in the event of power failure at the input side, or they may be used continuously to provide an output supply that is more highly conditioned than the input supply. Various interconnections with switches 126, 128 are provided and the whole unit is under control of a controller 130.

Controller 130 will typically comprise digital signal processing circuits (DSPs), one or more micro controllers and/or digital circuits implemented for example by FPGA devices. Each converter 120, 124 comprises in practice numerous power switches that are operated in rapid sequence to convert voltages to different levels, and from DC to AC or AC to DC. All of these are well known functions in the art. To perform its operation, controller 130 is also connected to numerous sensing circuits for measuring currents, voltages, temperatures and the like throughout the system. A few examples are illustrated in dotted lines. Currents can be sensed by current transformers and the sensing circuit for an output current of UPS-1 is indicated at 132, by way of example. The current flowing out of UPS-1 may be measured and labeled i_load_1, and measured by sensor 132. Other currents and voltages within the system can be measured likewise. The output current of the second UPS, UPS-2, can similarly be labeled i_load_2. Between the controllers of the various UPS units, a communications bus COM is provided, that can be used for supervision purposes, as is well known.

For operation in parallel, some cooperation is required between the controllers of the various UPS units, to ensure that they share the load evenly, and do not end up driving one another unnecessarily. In accordance with an embodiment of the present invention, the controllers 130 in the UPS units UPS-1, UPS-2 etc are arranged so as to supply a share of the current to load 1 and 2 that is proportionate to their individual power ratings. That is to say, if all the UPS units in system 100 have identical power ratings, then each will supply an equal share of the total current i_tot. On the other hand, if different UPS units have different power ratings, each will supply a share of the total current, in proportion to its power rating. This is not a feature of known UPS units, even when they are designed to be connected in parallel. Before describing how the proportionate sharing arrangement is implemented, we will describe the operation of existing units.

In order to control the sharing of the load current, it is not necessary to measure directly the total current i_tot flowing to the load, although of course this may be measured and monitored by an overall system controller (not shown). Rather, in the present example, each UPS unit includes a dedicated module 136 that measures currents within the unit, and is interconnected by wires 138 with similar modules 136 in each of the UPS devices collected in parallel. The purpose of the module 136 is to supply to the controller 130 a value for an "exchange current" i_exch, that can be used by the controller in each unit, to assist in load sharing. More detail of these modules and interconnections will be provided later. The exchange current, as its name implies, is a portion of the output current i_load that is not being delivered to the overall system load 102, but is effectively being exchanged between the parallel UPS units.

FIG. 2 illustrates the principle of load sharing between two UPS units UPS-1 and UPS-2 in a known commercial embodiment. Each UPS unit supplies a current i_load_1, i_load_2 into the parallel connection, so as to supply total current i_tot to the load 102. The output supply lines have a certain inductance, represented by inductors L1, L2. Each UPS unit has its own output voltage v_out_1, v_out_2. A mutator is a term for one "arm" or "leg" of a DC-AC, AC-DC or DC-DC converter, in which power switches are provided at the high side and low side of an output line. These switches connect the output line alternately to high- and low-side DC supplies, so as to generate a desired AC output waveform. The mutator output will typically feed an output capacitor, via an output inductance. The UPS output current i_load is drawn then from the output capacitor, and is a smoothed version of the mutator output. In a 3-phase converter, an additional mutator may be provided for driving an internal neutral line, to which the individual output capacitors are connected in a star topology. The exact construction of the UPS is not relevant to the present invention, but it is useful to recognize that measurements of "output current", for a UPS may be made not at the final output i_load, but at some earlier part of the circuit. It should also be remembered that measurements and control functions can be implemented independently for each phase of a multi-phase output.

FIG. 3 is a schematic diagram of the exchange current monitoring module 136 that is provided in each UPS unit, where the UPS is to be connected in a parallel system 100. In a known, commercial embodiment, module 136 is a plug-in board that can be added to a single UPS unit, to adapt it for parallel operation. Different implementations are of course possible. Within module 136, a current transformer 300 is provided for sensing current in and output line of the UPS unit. As already mentioned, this could in principle be the final output current i_load of the UPS unit. In a preferred embodiment, however, it happens to be the mutator current i_mut that is sensed, prior to smoothing. In the secondary loop of current transformer 300, resistors 302 are connected as a potential divider. Transient voltage suppressors 304 are also shown. Across the resistive divider, voltage transformers 306, 308 are connected as shown, and these provide at terminals 310, 312 a voltage output which carries a measure of the so-called "exchange current" i_exch. In this example, the voltage ratios of transformers 306, 308 are the same. In order for this exchange current to be measured, terminals 314 and 316 of this module 136 are connected to the corresponding terminals 314, 316 of all the other UPS units that are currently connected in parallel. A switch 318 is provided and controlled by the controller 130 in the UPS unit, so as to isolate the module 136 from those of other UPS units, at times when the present UPS unit is not currently in operation.

In a known commercial system, the modules 136 and the interconnections 314, 316 are used to measure exchange current, and the controller 130 in each UPS unit takes note of the measured exchange current and adjusts the UPS output current to drive the exchange current to zero. In this way, as illustrated in FIG. 2, the total current i_tot is divided equally in half by the UPS units, so that i_load_1=i_load_2=i_tot/2.

FIG. 4 illustrates, purely by way of example, a current control loop implemented in the controller 130 of a UPS unit in the known system. Certain input variables for the control loop are either measured or dictated as follows: v_out is a measurement of the output voltage of the UPS unit; v_ref is an internally-generated reference voltage, representing a target to which the output voltage should be controlled; i_load is the output current of the UPS unit; i_mut is a measured mutator current, previously mentioned; i_cap is an internally-generated theoretical capacitor current waveform that models the smoothing effect of the output capacitors, previously mentioned; i_exch is the measured exchange current obtained from module 136 (FIG. 3). Each of these variables is received and processed through a respective transfer function H_vo, H_iload etc, and combined as illustrated by logic functions 410-440, to generate a composite value i_ref. Each of logic functions 410-440 can include one or more adder and subtractor, according to the '+' and '−' signs shown in FIG. 4. This value i_ref is compared with the measured mutator current i_mut and used to generate a control value eps_i for the convertor 124. The control value eps_i is a value indicating a current error of the system and the difference between the composite value i_ref and the measured mutator current i_mut.

By suitable design and execution of this control loop, the output current i_load of the UPS is controlled in real time to achieve a desired output voltage v_out=v_ref, and to drive to zero the exchange current i_exch. Transfer functions H associated with each variable and intermediate result are of course carefully designed with respect to their gain and frequency response, so as to obtain the desired control characteristics. Other control loops, for example a voltage control loop, may also be implemented. Depending on the detailed implementation of the controller 130 hardware, implementation may be in hardware circuits, in FPGA programming, microprocessor programming, DSP programming or a combination of these. Depending on the implementation, a change in the control loop architecture and/or response characteristics can be effected simply by reprogramming of software modules and/or registers within controller 130. Such reprogramming may be done at a factory, and/or in the field, for example by a computer connected to the communications bus COM (FIG. 1).

Now, by operation of the modules 136 and the known control loop of FIG. 4 in each UPS unit, the exchange current measurement by module 136 gives for the UPS-1:

$$i\_exch\_1 = k\_exch[i\_mut\_1 - (i\_mut\_1 + i\_mut\_2)/2]$$
$$= (i\_mut\_1 - i\_mut\_2)/2$$

where k_exch is a constant and can be defined by the multiplication of an electrical resistance of the resistor 302 with the voltage ratio of transformers 306, 308.

For an arbitrary number N of UPS units in parallel, labelled UPS-1 to UPS-N, each UPS unit UPS-x has an exchange current i_exch_x defined by the formula:

$$i\_exch\_x = k\_exch[i\_mut\_x - (i\_mut\_1 + \ldots + i\_mut\_N)/N].$$

In this way, i_exch for each UPS is controlled to be 0. Consequently, for two UPS in parallel, i_load_1=i_load_2=i_tot/2. The skilled person would understand that i_exch_1 and i_exch_2 are approximately 0 in a conventional UPS system.

While this equal division of the load current is appropriate for two identical UPS units, it may sometimes be desirable to connect UPS units having different power ratings in parallel with one another. Suppose UPS-1 has a nominal power rating of 500 kVA and UPS-2 has a nominal power rating of 300 kVA. Using the known control loop to set the exchange current to zero, the 300 kVA and 500 kVA units will still each provide the same current level to the load. This is undesirable for maximising capacity of the whole system, and for avoiding undue stress on the weaker units.

Figure 5:
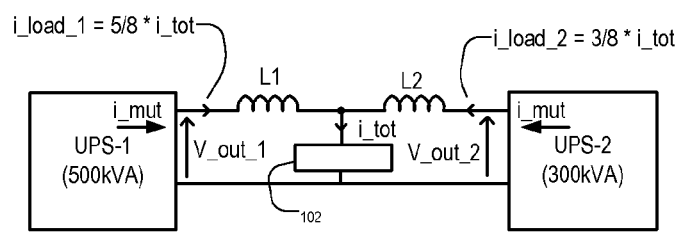
FIG. 5 illustrates a principle of non-equal load sharing in a parallel UPS system according to an embodiment of the present invention.

FIG. 5 is a diagram similar to FIG. 2, but showing the proportionate division of current between non-identical UPS units, in a system of 100 operating according to an embodiment of the present invention. It will be seen that UPS-1 has a power rating of 500 kVA while UPS-2 has a rating of only 300 kVA. Whatever is the total current i_tot to load 102, the current from the first UPS unit i_load_1 should be ⅝ of the total, and the current i_load_2 on the second UPS unit should be ⅜ of the total. The inventors have recognized that this desired outcome can be achieved by a simple modification of the control loop, illustrated in FIG. 6.

Figure 6:
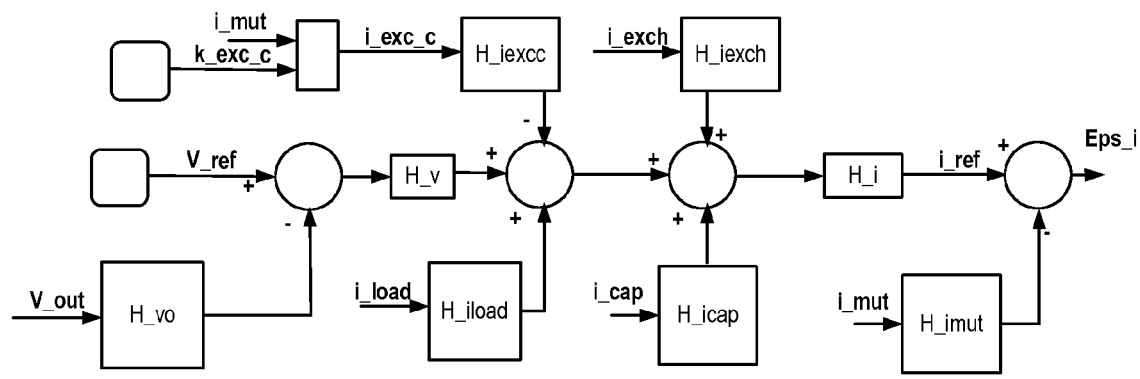
FIG. 6 illustrates a modified current control loop implemented in the system embodying the present invention.

FIG. 6 shows the modified control loop for current in the UPS units of system 100. This is identical to the known control loop shown in FIG. 4, except that an additional exchange compensation amount i_exc_c is calculated and subtracted at a suitable point in the overall calculation. The exchange compensation amount takes account of the actual output current (either the mutator current, the final output current or other suitable measure), but takes account also of stored values representing the power capacity individual UPS unit, in proportion to the total capacity of the units currently operating in parallel.

In a basic implementation, by adding an exchange compensation amount $$i\_exc\_c = i\_load * (Pnom - Pnom\_av)/Pnom$$
$$= i\_load * k\_exc\_c$$

each UPS will provide what is expected. We can call k_exc_c an exchange compensation factor determined by the nominal power Pnom of the individual UPS and is the average nominal power Pnom_av of all UPS in parallel in the system. Note that i_exc_c will need to be recalculated if one or more units drop out of the parallel operation, or are added in. This can be achieved automatically if desired, for example by status messages exchanged via communication bus COM.

In the previous example, with UPS-1 rated 500 kVA in parallel with UPS-2 rated 300 kVA:

$$Pnom\_av = (500 \text{ k} + 300 \text{ k})/2 = 400 \text{ k and}$$

$$Ptot = 800 \text{ k.}$$

Using the suffixes 500 kVA and 300 kVA to identify the values in UPS-1 and UPS-2 directly, the exchange compensation factor k_exc_c for each UPS is:

$$k\_exc\_c\_500\ kVA = (500\ k - 400\ k)/500\ k = \tfrac{1}{5}$$

$$k\_exc\_c\_300\ kVA = (300\ k - 400\ k)/300\ k = -\tfrac{1}{3}$$

In the specific example illustrated in FIG. 6, mutator current i_mut rather than the final output current i_load is used as a specific measure of the output current within each UPS unit, to optimize synchronization and efficiency. Therefore the additional current compensations in the control loops are:

$$i\_exc\_c\_500\ kVA = i\_mut\_500\ kVA * \tfrac{1}{5}.$$

$$i\_exc\_c\_300\ kVA = i\_mut\_300\ kVA * (-\tfrac{1}{3})$$

We can calculate the exchange current for both UPS:

$$\begin{aligned}i\_exch\_500\ kVA &= i\_load\_500\ kVA - \\ &\quad (i\_load\_300\ kVA + i\_load\_500\ kVA)/2 \\ &= i\_tot * (5/8 - (4/8)) \\ &= i\_tot/8\end{aligned}$$

$$\begin{aligned}i\_exch\_300\ kVA &= i\_load\_300\ kVA - \\ &\quad (i\_load\_300\ kVA + i\_load\_500\ kVA)/2 \\ &= i\_tot * (3/8 - (4/8)) \\ &= i\_tot/8\end{aligned}$$

We can likewise calculate the additional current compensation i_exc_c in each UPS controller as follows:

$$\begin{aligned}i\_exc\_c\_500\ kVA &= i\_load\_500\ kVA * (500-400)/500 \\ &= i\_load\_500\ kVA/5 \\ &= (i\_tot * 5/8)/5 \\ &= i\_tot/8\end{aligned}$$

$$\begin{aligned}i\_exc\_c\_300\ kVA &= i\_load\_300\ kVA * (300-400)/300 \\ &\quad i\_load\_300\ kVA(-1/3) \\ &= -(i\_tot * 3/8)/3 \\ &= -i\_tot/8\end{aligned}$$

These last two sets of equations confirm that the compensation amounts, when added to the existing control loop, cause exchange current to be regulated not to zero, but to the amount appropriate to ensure that the 300 kVA and 500 kVA UPS will provide respectively ⅜ and ⅝ of the current load. It will be appreciated that the exchange current will be steered towards a positive value in the case of a converter with higher than average nominal power rating, and towards a negative value in the case of a converter with lower than average power rating. Note also that this control is done primarily by processes (algorithms) and sensors within the individual UPS units, and without explicitly measuring the total current i_tot. In theory, the control of exchange current can therefore be managed continuously with performance according to the particular design of current feedback loop and/or voltage feedback loop. The skilled reader will understand that the feedback loop may be designed to allow for a delay from the current sensor, when designing a transfer function.

While specific embodiments of the invention have been described above, it is to be understood that numerous variations and modifications are possible without departing from the spirit and scope of the invention, defined in the appended claims. While UPS units generating a conditioned AC supply have been illustrated, these are just one example of a power converter, in which the invention may be useful. The generated supply need not be AC, but could be DC.

The control loops described herein can be implemented in hardware, software, firmware, middleware, microcode, or any combination thereof. For example, the invention may take the form of a computer program containing one or more sequences of machine-readable instructions which, when executed by a computer, causes the computer to perform one or more methods described above.

When the embodiments are implemented in software, firmware, middleware or microcode, program code or code segments, they can be stored in a machine-readable medium, such as a storage component. The term "machine-readable medium" can include, without being limited to, wireless channels and various other media capable of storing, containing, and/or carrying instruction(s) and/or data. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. All of the processes described above may be embodied in, and fully automated via, functional code modules executed by one or more general purpose electronic devices or processors. The code modules may be stored in any type of non-transitory machine-readable medium or other storage device. Some or all of the methods may alternatively be embodied in specialized hardware. Depending on the embodiment, the non-transitory machine-readable medium may be a hard disk drive, a compact disc, a digital video disc, a tape drive or other suitable storage medium.

The invention claimed is:

1. A method for controlling a number of power converters that are connected in parallel to supply a total electric current to a load, each power converter having a different nominal power rating, the method comprising: establishing real-time feedback control within each power converter so as to control a current supplied by that converter in accordance with a desired condition of supply; sensing in real time an imbalance current for each converter, the imbalance current representing an imbalance between an output current of the converter in question and output currents of the other converters operating in parallel; and modifying said feedback control in response to the sensed imbalance current so as to steer the imbalance current of each converter toward a value that is a non-zero proportion of a current supplied by the converter, the non-zero proportion being different converters having different nominal power ratings, whereby each converter is controlled to supply a predetermined proportion of the total electric current that is different for converters having different nominal power ratings;

wherein said non-zero proportion for each converter is calculated by comparing its nominal power rating with an average power rating of all the converters connected in parallel, so that the imbalance current will be steered towards a positive value in the case of a converter with higher than average nominal power rating and toward a negative value in the case of a converter with lower than average power rating.

2. A method as claimed in claim 1 wherein said non-zero proportion is calculated within each individual converter, based on information of their own power rating and information of power ratings obtained automatically by communication between the power converters.

3. A method as claimed in claim 2 wherein said non-zero proportion is re-calculated automatically within each individual converter, in the event of a change in the operating status of one of said converters.

4. A method as claimed in claim 1 wherein said imbalance current is sensed by an imbalance current sensing circuit within each converter, each imbalance current sensing circuit being directly connected to one another to share an analog signal.

5. A method as claimed in claim 1 wherein said imbalance current is sensed at the output of a switched leg within the converter, prior to smoothing by a capacitor at the output of the converter.

6. A method as claimed in claim 1 wherein each of said power converters is part of an uninterruptible power supply (UPS) unit, each UPS unit being connected between a mains electricity supply and said load, and each including a battery for supplying power to said power converter in the event of failure of said mains supply.

7. A method as claimed in claim 1 wherein each of said power converters is a multi-phase power converter and said supplied current is one phase of a multi-phase supply, and wherein said imbalance current sensing and feedback control are implemented in parallel for each phase of said multi-phase supply.

8. A power converter apparatus suitable for use as one of a number of power converters that are connected in parallel to supply a total electric current to a load, the power converter having a nominal power rating and comprising: a plurality of switches and other components connected to be operable as a power converter; a controller arranged to establish real-time feedback control of said switches so as to control a current supplied by the power converter in response to one or more sensor inputs and in accordance with a desired condition of supply; and a module for sensing in real time an imbalance current for each converter, the imbalance current representing an imbalance between an output current of the converter in question and output currents of the other converters operating in parallel; wherein said controller is arranged to modify said feedback control in response the sensed imbalance current so as to steer the imbalance current of each converter toward a value that is a non-zero proportion of a current sensed within the converter when connected in parallel with at least one other power converter having a different nominal power rating, to supply the total electric current to the load;

wherein said controller is arranged to calculate said non-zero proportion by comparing its nominal power rating with an average power rating of all the converters connected in parallel, so that the imbalance current will be steered towards a positive value in the case of a converter with higher than average nominal power rating and toward a negative value in the case of a converter with lower than average power rating.

9. A power converter as claimed in claim 8 wherein said controller is arranged to calculate said non-zero proportion automatically, and for this purpose to information of power ratings automatically by communication with other power converters.

10. A power converter as claimed in claim 9 wherein said controller is arranged to re-calculate said non-zero proportion automatically in the event of a change in the operating status of one of said converters.

11. A power converter as claimed in claim 8 wherein said module for sensing imbalance current comprises an imbalance current sensing circuit associated with the converter, said circuit having terminals for connection to imbalance current sensing circuits of other power converters operating in parallel.

12. An uninterruptible power supply (UPS) system comprising a plurality of UPS units connected in parallel, wherein each UPS unit comprises a power converter with an imbalance current sensing circuit as claimed in claim 11, and wherein the imbalance current sensing circuits of the parallel-connected UPS units are connected together by said terminals.

13. A power converter as claimed in claim 8 wherein said converter comprises an output capacitor connected between said switches and an output of the power converter for smoothing the supplied current, and wherein said imbalance current is sensed at the output of said switches within the converter, prior to smoothing by the output capacitor.

14. A power converter as claimed in claim 8 wherein said power converter is part of an uninterruptible power supply (UPS) unit, the UPS unit being adapted for connection between a mains electricity supply and said load, and including a battery for supplying power to said power converter in the event of failure of said mains supply.

15. A power converter as claimed in claim 8 wherein said power converter is a multi-phase power converter and said supplied current is one phase of a multi-phase supply, and wherein said switches, said imbalance current sensing and said feedback control are implemented in parallel for each phase of said multi-phase supply.

16. An uninterruptible power supply (UPS) system comprising a plurality of UPS units connected in parallel, wherein each UPS unit comprises a power converter as claimed in claim 8.

17. A non-transitory computer-readable medium having instructions encoded thereon that, when acted upon by a processor, cause a power converter to operate with a non-zero imbalance current, according to a method comprising: establishing real-time feedback control so as to control a current supplied by the converter in accordance with a desired condition of supply; sensing in real time the imbalance current for the converter, the imbalance current representing an imbalance between an output current of the converter and output currents of other converters operating in parallel; and modifying said feedback control in response to the sensed imbalance current so as to steer the output current of the converter toward a value that is a predetermined non-zero proportion of a total electric current supplied to a load, the predetermined non-zero proportion being different for each converter having different nominal power ratings.

* * * * *